June 29, 1965     H. F. A. TOPSOE     3,191,361
METHOD OF RELIEVING A HYDROGEN-CONTAINING GAS-MIXTURE
OF READILY SOLUBLE GASES CONTAINED IN THE MIXTURE
Filed March 31, 1961
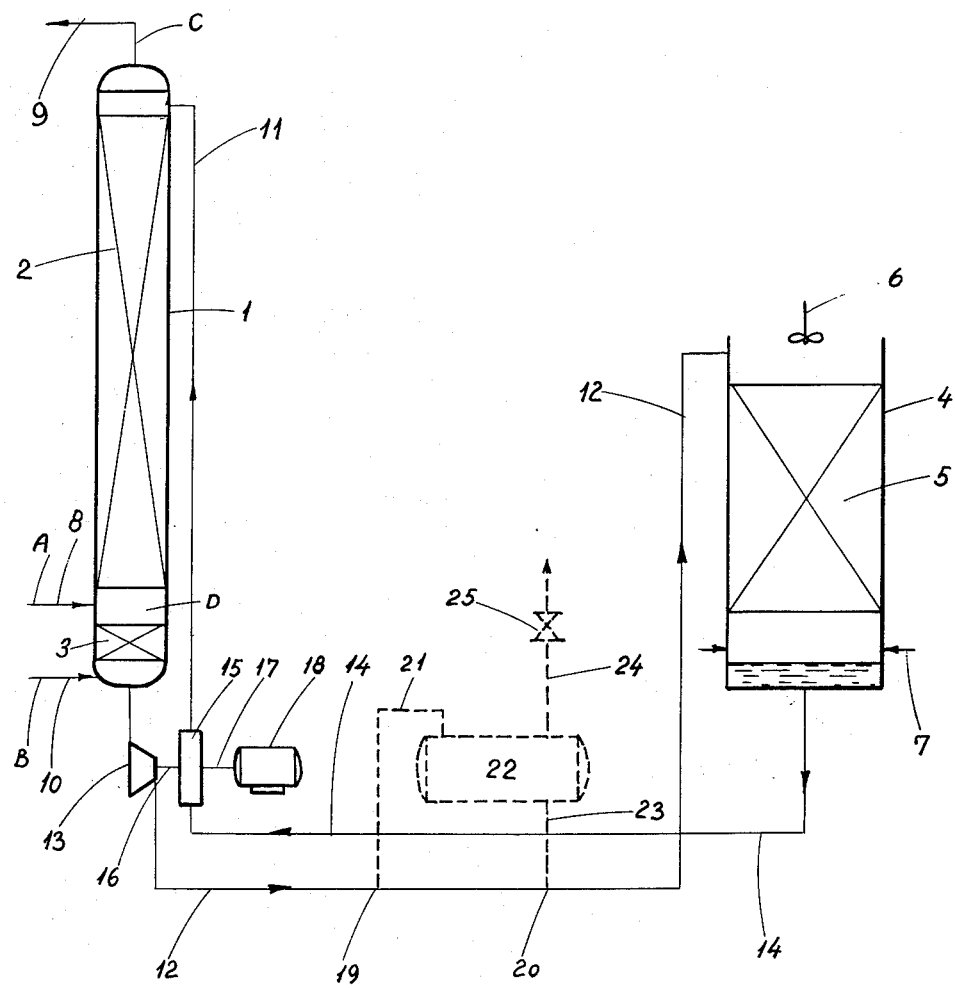
Inventor:
Haldor F. A. Topsøe
by Sol Shappirio
Attorney

3,191,361
METHOD OF RELIEVING A HYDROGEN-CONTAINING GAS-MIXTURE OF READILY SOLUBLE GASES CONTAINED IN THE MIXTURE
Haldor Frederik Axel Topsøe, 73 Baunegardsvej, Hellerup, Denmark
Filed Mar. 31, 1961, Ser. No. 99,892
1 Claim. (Cl. 55—44)

In connection with the industrial use of gases it is desirable wholly or partially to remove carbon dioxide contained therein. This, for example, is the case with gases produced for the purpose of synthesizing ammonia or methanol and with gases to be used for the production of concentrated hydrogen.

It is well known that carbon dioxide and other gases easily soluble in water, such as sulphur dioxide and hydrogen sulphide, may be removed from gas mixtures containing components slightly soluble in water, comprising hydrogen and, in some cases also carbon monoxide, the removal being carried out industrially by causing the easily soluble gases to be absorbed in water under superatmospheric pressure. This invention has for its object an improved method of this general character.

The solubility in water of the gases to be absorbed, increases with the pressure of the gases and with decreasing temperature. Accordingly, in a known process, the absorption is carried out by introducing a gaseous mixture, containing easily and slightly soluble components, as above specified, after its having been compressed to a suitable superatmospheric pressure into the lower part of an absorption tower or scrubber, in which the mixture is caused to contact water, said water being supplied at the top and trickling down the tower, counter current to the gaseous mixture ascending, the water being removed from the foot together with its contents of easily soluble gases absorbed therein. Usually the water used in the absorption process is kept circulating, the water more or less saturated with the easily soluble gases removed at the foot of the tower, being subjected to pressure release to atmospheric pressure and then carried to a plant in which it is regenerated by being brought into contact with a gaseous fluid, generally atmospheric air, by means of which the easily soluble gases are extensively expelled. The water thus regenerated is returned to the top of the absorption tower by an appropriate pump. A considerable part of the costs involved in this process is due to the power consumption of the pressure pumps, used for recirculating the considerable amount of water involved. But it is well known that these costs can be reduced by recovering part of the energy contents of the water, which can be done by allowing the release of pressure to take place with recovery of energy, for instance, in a turbine.

In using the process of purification above described, it is a disadvantage that not inconsiderable amounts of hydrogen and carbon monoxide (if present in the gas) are lost, the solubility of the slightly soluble gases being of such magnitude that several percent of the contents thereof (in the case of normal synthesis raw gases) will leave the absorption tower with the water. If no particular precautions be taken, this proportion of said gases will get lost to the atmosphere on the release of pressure and subsequent regeneration of the water. It is true that this loss may be reduced by carrying out a two-step release of the pressure prevailing on the water leaving the tower, in which case the main part of the hydrogen (and carbon monoxide, if present) will leave at an intermediate pressure so that it may be recompressed and returned to the gas content, if so desired, after the carbon dioxide contained therein having first been removed; but the recovery is rather incomplete and it is obtained only on the expense of considerably complicating the process and decreasing the rate of power recovery obtainable.

In accordance with the present invention, on the contrary, in a process for removing carbon dioxide and other gases easily soluble in water, from mixtures of gases slightly soluble in water and comprising hydrogen and in some cases also carbon monoxide, by absorption with water under pressure, a greater reduction in the loss of slightly soluble gases can be obtained without the above-named disadvantages.

With this object and purpose in view the improvement forming the subject matter of the present invention consists in that the amounts of hydrogen (and carbon monoxide, if present) dissolved in the water are wholly or partially expelled by contacting the water containing these components in solution, with nitrogen in a step separate from the liberation of the easily soluble gases. By causing such contact it will result that the amount of hydrogen (and carbon monoxide, if present) having primarily been absorbed by the water, is completely or almost completely released, part of the nitrogen being at the same time absorbed by the water and removed therefrom in the regeneration part of the plant.

In a preferred embodiment of the invention the contact of the water with nitrogen, like its contact with the synthesis gas, is accomplished under pressure, which causes the primarily adsorbed hydrogen (and carbon monoxide, if any) to be liberated under pressure, so that it can directly pass into the gas to be treated in the process. Moreover, by carrying out the contacting of the water with the water still under pressure the release takes up but a small volume of the apparatus.

The contacting of the water with nitrogen is carried out preferably according to the invention, by causing the water to run down through a current of ascending nitrogen.

In a particularly advantageous embodiment of the present invention, the passage of the water through an atmosphere of nitrogen takes place in the lower part of a column, in the upper part of which the water runs in the manner known per se through an ascending current of the carbon dioxide-containing gas (containing in some cases also carbon monoxide), nitrogen being supplied to the lower part of the column and the hydrogen-containing gas somewhat higher, whereas the hydrogen (and carbon monoxide, if any) released from the water in the lower part passes directly, together with any excess nitrogen, to the upper part of the column. The purpose or object of the invention is thus attained by relatively small uncomplicated means.

Just as in the known processes referred to above, the release of the pressure resting upon the circulating water, can be undertaken stepwise whereby part of the gases dissolved in the water are liberated at an intermediate pressure. While this process suffers from the drawback that the recoverable proportion of the power rested in the circulation of water is diminished, it may be an advantage in some cases, even in connection with the present process, that such intermediate release can be undertaken, the main part of the nitrogen dissolved in the water being thereby released together with only a small part of the carbon dioxide dissolved, whereas a substantial part of the carbon dioxide can be recovered on a subsequent detensioning of the water at atmospheric pressure. For this purpose the latter detensioning of the water should be carried out prior to the final regeneration of the water, which is normally carried out in a cooling tower with air draft as specified above.

For the purpose of illustration, an embodiment of the process according to the invention will be described in the following with reference to the drawing showing such embodiment by means of a diagram symbolizing the individual steps thereof.

In the drawing, 1 is an absorption column comprising packed sections separated by intermediate supports 2 and 3 of appropriate well known construction. 4 is a regeneration tower with packing 5, ventilator 6 and air admission 7. 8 is an inlet and 9 an outlet tube for the gas under treatment. 10 is an inlet tube for technically pure nitrogen. The raw gas mixture and the nitrogen are introduced at a considerable superatmospheric pressure, e.g., 10–35 atmos. The circulation of water takes place through an inlet pipe 11 connected to the top of the absorption column 1, a pipe 12 from the bottom of the absorption column leading through a turbine 13 to the top of the regeneration tower 4 and a pipe 14 from the bottom of said tower through a pump 15 to the inlet pipe 11. The turbine 13 drives a pump 15 through the shaft 16 assisted by a motor 18 delivering energy to the pump 15 through a shaft 17.

In a modified embodiment a part of the pipe 12, viz., the part between the points 19 and 20 is omitted and in its place there is inserted a pipe 21 leading to an intermediate release container 22 from the bottom of which the water is returned through a pipe 23 to the pipe 12 in the point 20. The intermediate release container has at its top a gas outlet pipe provided with a valve 25.

The process carried out in this apparatus is as follows:

Through the pipe 8 the raw gas-mixture is admitted and ascends through the packing 2 countercurrent to regenerated water admitted at the top of the absorption column through the pipe 11. During the passage the contents of carbon dioxide of the raw gas-mixture is almost completely removed and any hydrogen sulphide present is completely absorbed by the water which takes up further part of the hydrogen and carbon monoxide. During the further passage of the water through the packing 3 counter-current to ascending nitrogen almost all hydrogen and carbon monoxide absorbed by the water is expelled, part of the nitrogen being absorbed by the water and part of it continuing its way upwards through the column where it is mixed with the raw gas-mixture admitted through the pipe 8. The water passes under the pressure prevailing in the absorption column into the turbine 13 where a pressure release takes place and further to the top of the regeneration tower 4. In this tower the water descends under atmospheric pressure through the packing 5 counter-current to atmospheric air sucked into the tower by means of a blower 6. Thereby the carbon dioxide and hydrogen sulphide are liberated together with most of the nitrogen; the water deprived of its contents of these substances gathers at the bottom of the tower, from where it is pumped into the absorption column through the pump 15.

In order to illustrate the effect obtained by using the method specified in the above example, the gas-mixture has been analyzed as it is passing the points A–D in the drawing. By way of example a hydrogen containing raw gas appropriate for making a preliminary step in the preparation of synthesis gas for producing ammonia has been chosen.

Table

|  | A | B | C | D |
| --- | --- | --- | --- | --- |
| $CO$ | 383 |  | 382 | 12 |
| $H_2$ | 9,500 |  | 9,480 | 250 |
| $CO_2$ | 4,670 |  | 50 | 174 |
| $H_2S$ | 2.2 |  |  |  |
| $CH_4$ | 22.3 |  | 22.2 | 1.0 |
| A | 25.3 |  | 25.2 | 1.4 |
| $N_2$ | 80.0 | 580 | 332 | 240 |
| $O_2$ |  |  | 6.2 |  |

The quantities of gas have been given in cubic meters per hour at normal conditions of pressure and temperature (750 mm. Hg, 20° C.). Instead of leading the water directly from the turbine to the top of the regeneration tower 4 it may be passed through an intermediate release container, from which a quantity of gas depending on the pressure maintained in said container can be delivered. By such intermediate release the gas discharge will contain the greater part of the nitrogen whereby it is obtained that, in a subsequent complete release of pressure, prior to the regeneration, almost pure carbon dioxide can be recovered. Appropriate means for this purpose are well known and not shown in the drawing.

The absorption of carbon dioxide and the absorption of nitrogen causing the liberation of the hydrogen absorbed by the water may be carried out in a separate container, both containers being, if desired, of an appropriate description differing from the one shown diagrammatically in the drawing, such constructions being well known.

I claim:

Method of removing $CO_2$ from a hydrogen-containing gas-mixture containing $CO_2$, comprising subjecting a current of the hydrogen-containing gas mixture under superatmospheric pressure to contact with water, thereby effecting an extraction of $CO_2$ therefrom together with some hydrogen dissolved together with said $CO_2$ in the said water, and subsequently contacting the aqueous solution thus obtained with gaseous nitrogen at substantially the same superatmospheric pressure as the absorption process so as to effect a substantial liberation of the said hydrogen dissolved by the water, mixing the hydrogen thus liberated, and non-dissolved nitrogen, with the current of hydrogen-containing mixture, and subsequently liberating the $CO_2$ from the aqueous solution in a step separate from the liberation of hydrogen, under a pressure lower than that used during the absorption process.

References Cited by the Examiner

UNITED STATES PATENTS 2,791,290  5/57  Natta _____ 55—44
3,001,373  9/61  Du Bois Eastman et al. __ 55—68 X REUBEN FRIEDMAN, Primary Examiner.

HERBERT L. MARTIN, Examiner.